July 24, 1951 J. HERMENS 2,561,697
NUT CRACKING MACHINE
Filed Oct. 15, 1948 6 Sheets-Sheet 1

INVENTOR.
John Hermens
BY
Atty.

July 24, 1951   J. HERMENS   2,561,697
NUT CRACKING MACHINE
Filed Oct. 15, 1948   6 Sheets-Sheet 3

INVENTOR.
John Hermens
BY
Atty.

July 24, 1951
J. HERMENS
2,561,697
NUT CRACKING MACHINE
Filed Oct. 15, 1948
6 Sheets-Sheet 4
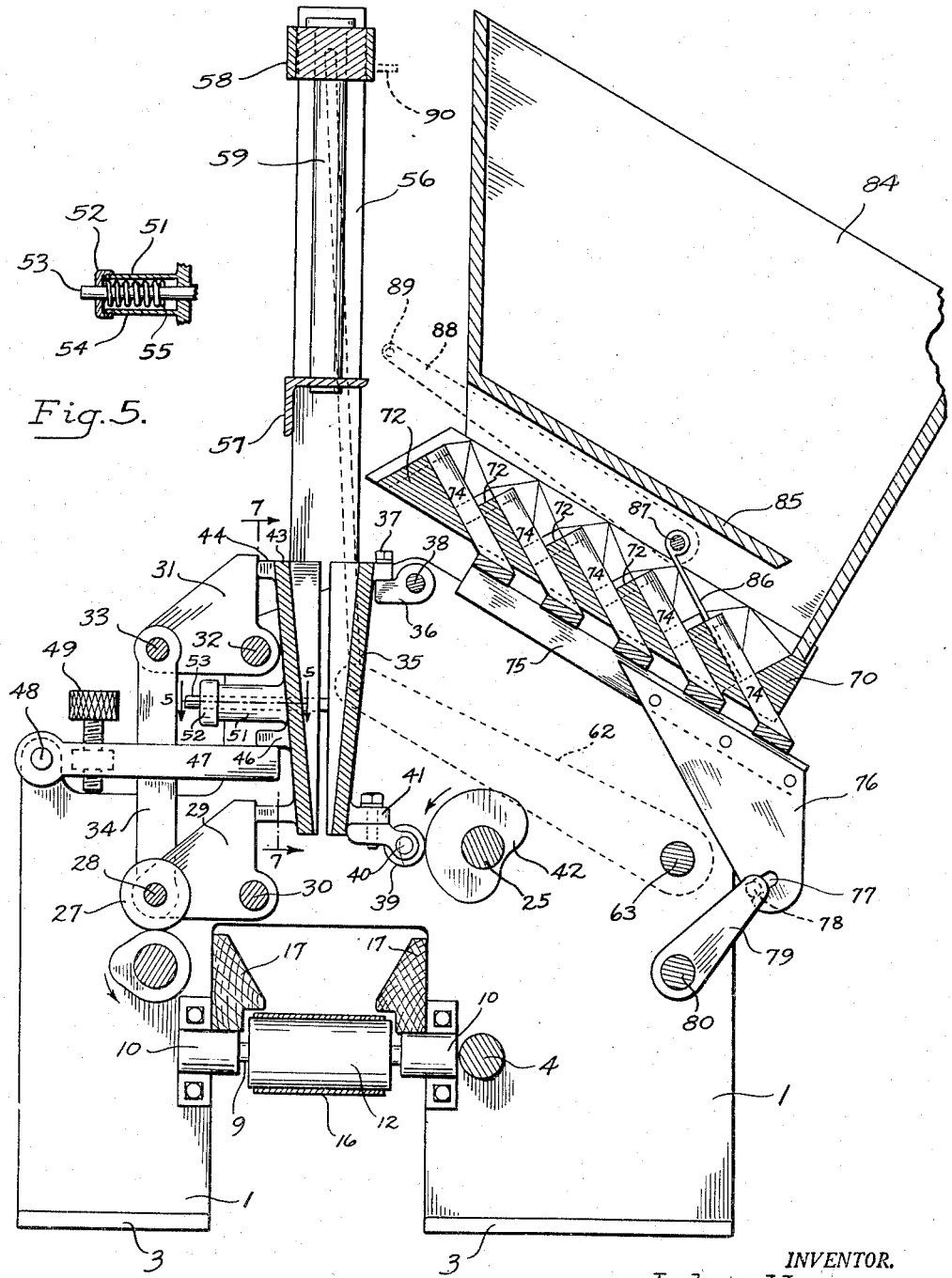
Fig. 5.
Fig. 4.
INVENTOR.
John Hermens
BY
Atty.

July 24, 1951　　　　　　　　J. HERMENS　　　　　　　　2,561,697
NUT CRACKING MACHINE
Filed Oct. 15, 1948　　　　　　　　　　　　　　　　6 Sheets-Sheet 6

INVENTOR.
John Hermens
BY
Atty.

Patented July 24, 1951

2,561,697

UNITED STATES PATENT OFFICE 2,561,697

NUT CRACKING MACHINE

John Hermens, McMinnville, Oreg.

Application October 15, 1948, Serial No. 54,610

5 Claims. (Cl. 146—12)

My invention pertains to mechanism for cracking nuts, and relates particularly to a device by which a quantity of nuts of diverse sizes may be separated and subjected individually to a crushing action in a continuous sequential operation.

It is a principal object of my invention to provide in a nut cracking device mechanism for separating a quantity of nuts stored in a hopper and thence to convey and deposit said individual nuts selectively into the separate crushing units of the apparatus.

Another object is the provision in a nut cracking apparatus of crushing jaws constructed and arranged to accommodate diverse sizes of nuts for crushing treatment thereby. In this regard, a more specific object is the provision in a nut cracking machine of cooperating crusher jaws which may adjust themselves to accommodate nuts of diverse sizes.

A further important object is the provision in a nut cracking mechanism of novel crusher means by which the individual nuts of diverse sizes are held in close contact with the crushing jaws to insure positive action thereon by the latter. It is also an object of my invention to provide damping means for arresting the force with which said pressure means contacts said nuts, thereby preventing premature crushing of the latter.

A further object of my invention is to provide a nut cracking machine in which the sorting and crushing of individual nuts is effected in a continuous automatic operation.

These and other objects and advantages of my invention will appear from the following detailed description, taken in connection with the accompanying drawings, in which:

Fig. 4 is a sectional elevation similar to Fig. 3 showing the crushing jaws in retracted or open position;

Fig. 5 is a fragmentary sectional view taken along the line 5—5 in Fig. 4 showing details of the spring mechanism for opening the crushing jaws;

Figures 7, 8:
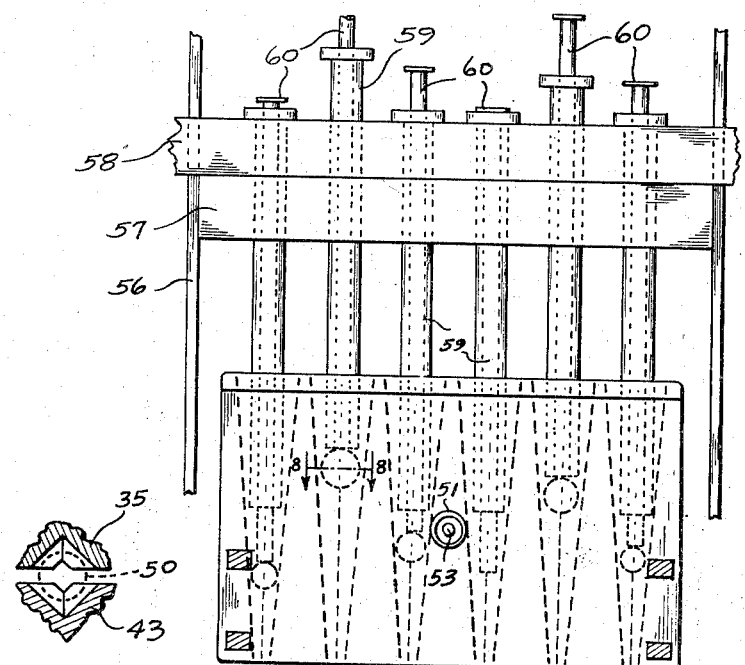
Fig. 7 is a fragmentary side elevation of the crushing jaws and hold-down bar showing a modified form of weight means for holding the nuts in contact with said jaws.
Figure 9:
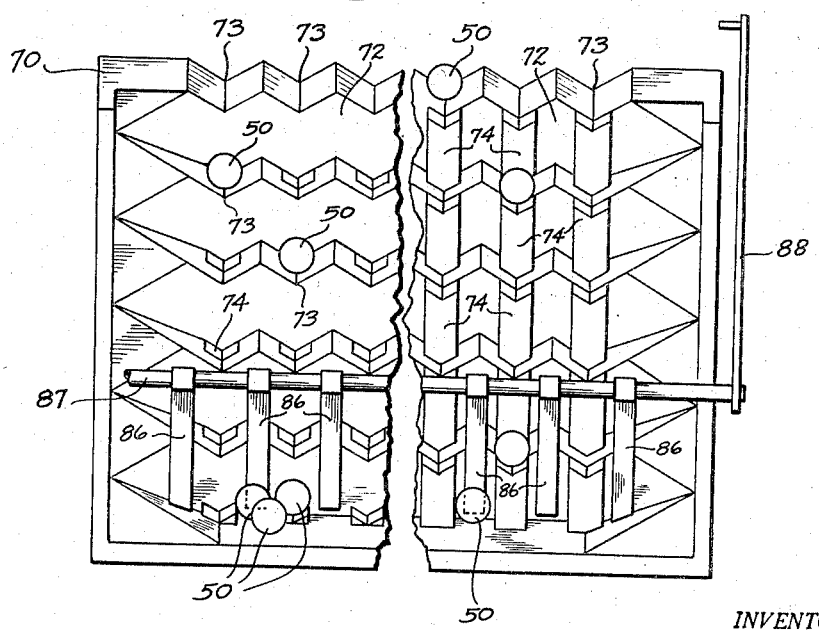

Fig. 8 is a fragmentary sectional view taken along the line 8—8 in Fig. 7 showing details of construction of the crushing jaws; and Fig. 9 is a foreshortened plan view of a sorting and conveying table embodying the features of my invention showing the shaker means by which a mass of nuts may be separated for deposit in the conveyor device, the left-hand portion showing the conveyor fingers in retracted position and the right-hand portion showing the conveyor fingers in elevated or extended position.

Figure 6:
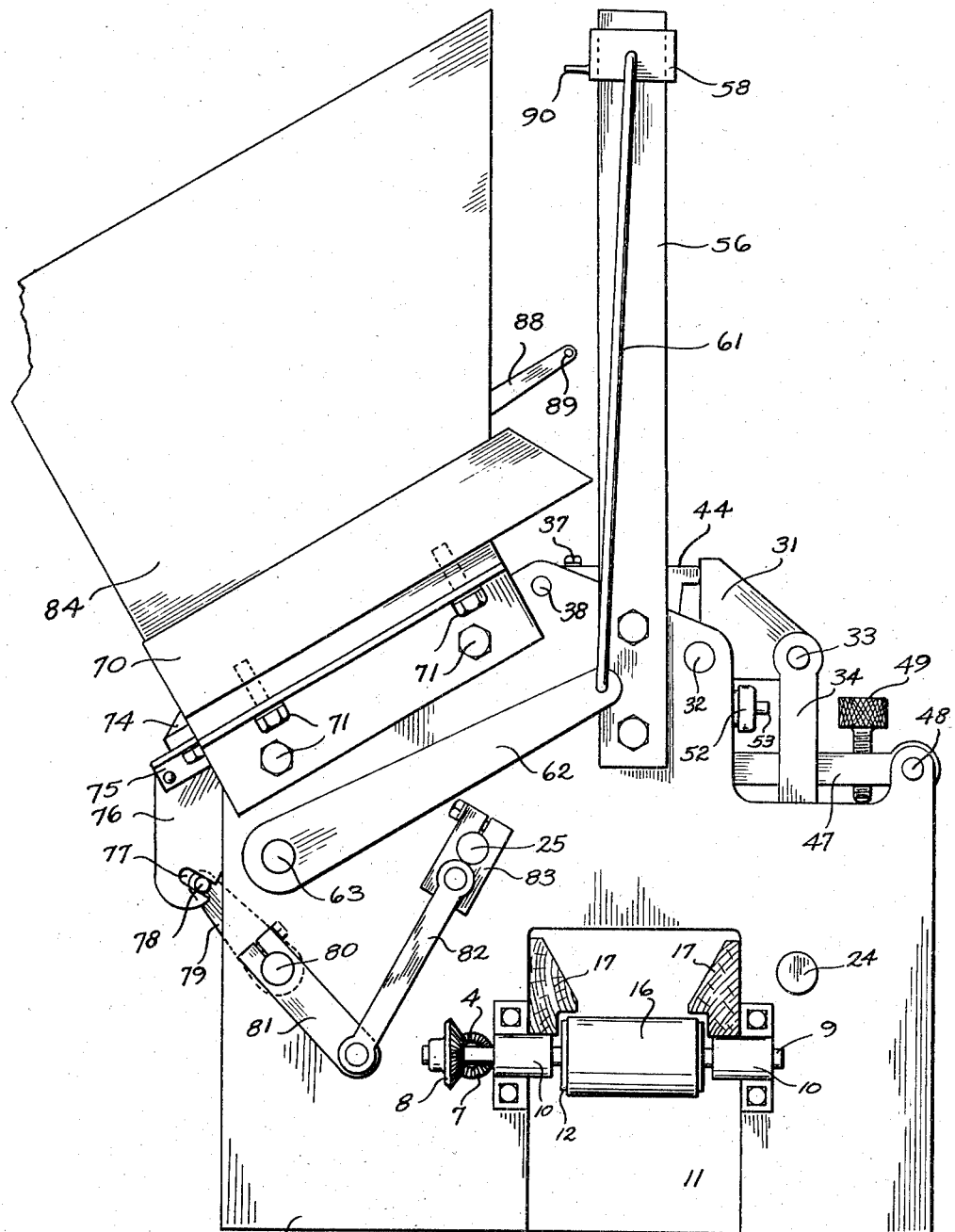
Fig. 6 is a side elevation as viewed from the left in Fig. 1.

The nut cracking device embodying my invention is mounted on spaced vertical side frames 1 and 2 which are bent inwardly at right angles along their bottom edges to form base footings 3 therefor. A main power shaft 4 extends transversely through the side frames and is rotated by means of a motor (not shown) connected thereto through pulley wheel 5. A slip clutch 6 interconnects sections of the power shaft 4 to insure against damage to the mechanism. The end of the power shaft 4 opposite the pulley wheel 5 is fitted with a bevel gear 7 which engages a second bevel gear 8 mounted at right angles thereto on shaft 9, as best shown in Fig. 6.

Shaft 9 is mounted for rotation in spaced bearings 10 secured to frame 1 adjacent opposite sides of the opening 11 provided in said frame. A roller 12 is secured about the shaft 9 between the bearings 10. A second roller 13 is secured to a shaft 14 mounted for rotation in bearings 15 which are fixed to frame 2. An endless belt 16 extends over rollers 12 and 13, passing through the opening 11 in frame 1. Guide members 17 are secured between frames 1 and 2 and overlie the upper longitudinal edges of the endless belt to prevent loss of material deposited upon the latter during operation of the device, as explained more fully hereinafter.

A drive gear 18 mounted on the power shaft 4 engages a power transfer gear 19 secured to a stub shaft 20 journaled for rotation in frame 2. A second gear 21, secured to stub shaft 20, engages the toothed periphery of each of two gears 22 and 23. Gear 22 is secured to shaft 24 which extends transversely between frames 1 and 2, while gear 23 is secured to shaft 25.

A pair of eccentric cams 26 are secured in spaced relation on the shaft 24 for rotation therewith. Idler wheels 27 which rest freely upon said cams are mounted rotatably on shaft 28. A substantially triangular plate 29 is joined rotatably at each end of the shaft 28 and mounted on shaft 30 which extends between the frames 1 and 2. A second pair of triangular plates 31 are mounted pivotally above the plates 29 on shaft 32 extending between the frames above the first pair. A rod 33 extending between the upper plate is connected to shaft 28 by means of vertical links 34. The plates 29 and 31 thus may pivot about their respective axes 30 and 32 in the manner of bell-crank levers for purposes presently to be described.

A pair of opposed crushing jaw units are arranged laterally between the frames 1 and 2. One of said jaws 35 is secured at its upper end to brackets 36 by means of bolts 37. The brackets 36 are mounted rotatably on the frames 1 and 2 by means of pins 38 about which the jaw 35 may pivot. Rollers 39 are mounted on shaft 40 journaled in brackets 41 which are secured to the opposite lower edges of the jaw 35. These rollers operatively engage the peripheral surface of eccentric kidney-shaped cams 42 secured in properly spaced relation on shaft 25.

The opposite jaw 43 is provided with laterally extending lugs 44, 45 and 46. Lugs 44 and 45 are arranged to abut against the upper portion of the triangular plates 31 and 29, respectively, while lugs 46 rest upon the terminal ends of arms 47 mounted pivotally to frames 1 and 2 through rod 48 which extends laterally between said frames. An adjustment screw 49, threaded through one of the arms 47, rests upon the upper edge of frame 1 and thus the arms may be adjusted vertically to position the jaw 43 in desired relation with jaw 35. That is, the vertical position of the jaw 43, and thus the position of lugs 44 and 45 relative to the abutting plates 31 and 29, respectively, may be adjusted to change the length of lateral movement of the jaw 43 with respect to jaw 35, since the amount of such movement is dependent upon the effective arc of rotation of said plates.

Each of the pair of crushing jaw units defines a plurality of spaced longitudinal grooves which diverge outwardly from bottom to top. With the pair of jaws arranged in opposed cooperating relation, the pairs of registering grooves form a plurality of tapered rectangular apertures, as best shown in Fig. 8. These apertures may thus accommodate various sizes of nuts 50 for cracking between the crushing jaws.

In order to provide for positive opening of the crushing jaws, a hollow cylinder 51 is formed on jaw 43 projecting outwardly from the face thereof. A centrally apertured cap 52 is threaded onto said cylinder to close the exposed end of the latter. A push rod 53 extends through the apertured cap and cylinder and thence through a hole formed centrally in the jaw 43 between adjacent apertures. A coil spring 54 encompasses the rod inside the cylinder, one end of said spring bearing against the cap 52 and the opposite end engaging a pin 55 projecting from the rod, as shown in Fig. 5. Thus the pressure of the spring urges the rod inwardly into abutment with the inner face of jaw 35, thereby tending to force jaw 43 away from jaw 35 when the plates 29 and 31 are in retracted position, as shown in Fig. 4.

I have found it desirable for efficient operation of the crushing jaws described hereinabove to provide means for holding the nuts 50 in positive contact with said jaws during the crushing operation, for otherwise the nuts tend to move upwardly as the jaws close and thereby resist cracking of the shell. A pair of vertical standards 56 are secured to the side frames 1 and 2, respectively, and held in spaced relation by means of the L-shaped brace 57 secured therebetween at proper height above the crushing jaws. A carrier bar 58 having slots formed therein to receive the vertical standard is movable vertically in said standard above the brace 57.

The bar and brace are provided with spaced registering apertures extending vertically therethrough for receiving slidably therein a plurality of tappet rods 59. These rods are arranged to extend into the spaced apertures formed by the opposed crushing jaws to a depth sufficient to contact the nuts deposited therein and thus to force the latter downwardly into positive engagement with the jaws when the carrier bar 58 is in its lowermost position resting upon the brace 57. In Fig. 7 I have shown a modified form of tappet rod wherein secondary rods 60 extend through central bores in the main rods 59 to a depth greater than that of the latter. These secondary rods function to hold down those nuts which are of smaller dimension than the diameter of the main rods 59.

Figure 1:
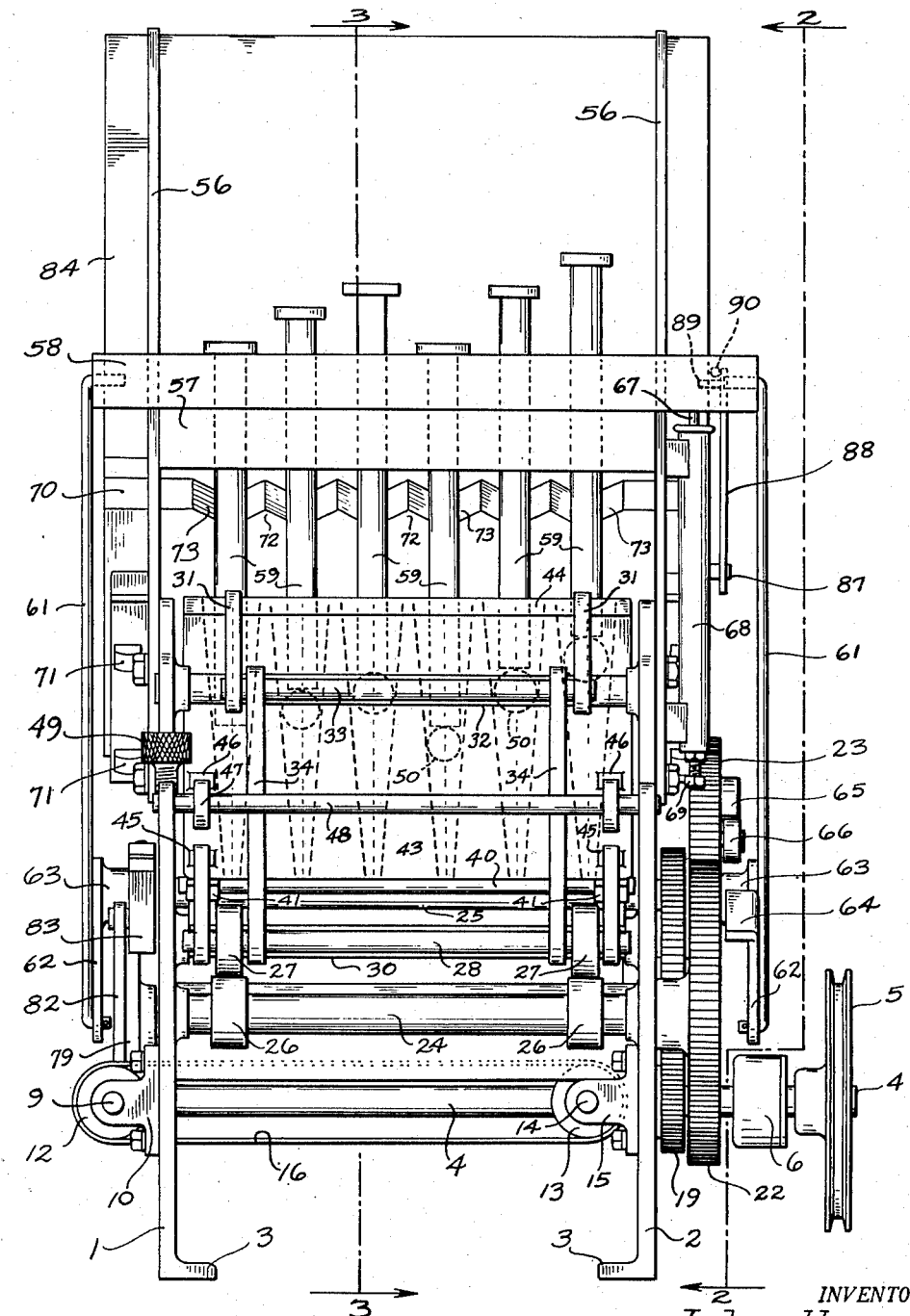
Fig. 1 is a front elevation of a nut cracking machine embodying the features of my invention, the hold-down bar and weights being shown in lowermost position.
Figure 2:
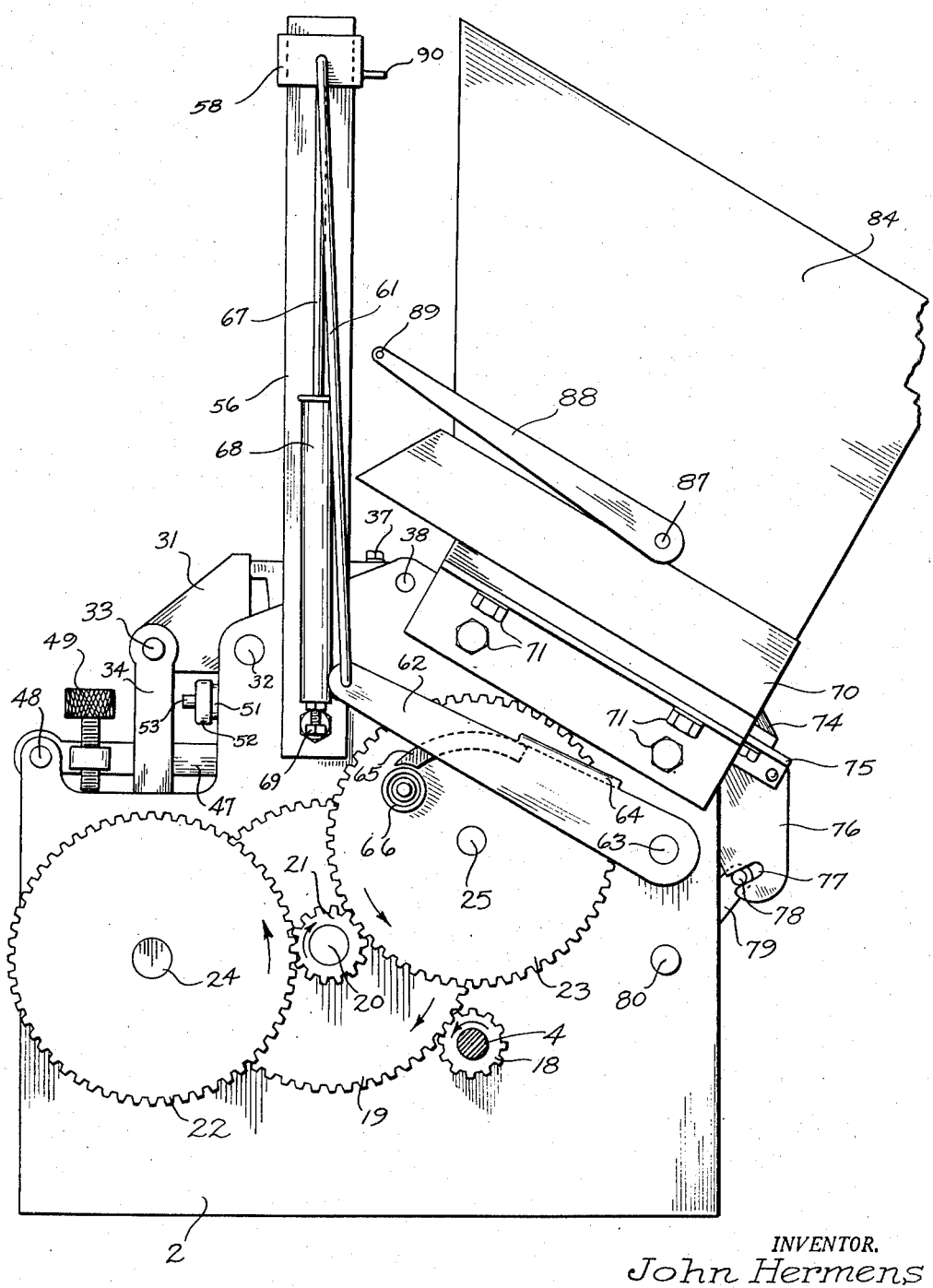
Fig. 2 is a side elevation taken substantially along the line 2—2 in Fig. 1 and showing the gear arrangement for operating the device, the difference between said figures being that Fig. 2 shows the hold-down bar in elevated position.

The carrier bar 58 is connected through link rods to the terminal ends of actuating arms 62 which are mounted pivotally on frames 1 and 2 by means of pins 63. One of said arms is provided with a laterally projecting flange 64 which extends toward the outer surface of gear 23. A projecting rib 65 is formed on gear 23 for engaging the flange 64. A roller 66 is mounted adjacent the forward end of the rib 65 and functions to make preliminary engagement with flange 64. This arrangement affords less frictional contact and decreases the wear of the parts. As gear 23 rotates in a counterclockwise direction, as indicated by the arrow in Fig. 2, the roller 66 and rib 65 engage the flange 64 and raise the arms 62. Upward movement of the arms thus causes the carrier bar 58 to be raised to its elevated position. Further rotation of the gear 23 moves the rib 65 away from the flange 64, whereupon the carrier bar falls by gravity to its lowermost position.

In order to retard the speed of the falling bar, and thus to prevent premature crushing of the nuts, a piston-and-cylinder element is connected between one of the vertical standards 56 and said carrier bar. The piston rod 67 is secured at its upper end to the carrier bar, while the cylinder 68 is mounted on the vertical standard 56. A piston secured to the lower end of the piston rod moves vertically within the cylinder. An adjustable air valve 69 communicates with the lower end of the cylinder and provides means for regulating the release of air from within the cylinder as the piston moves downwardly. In this manner, the rate of speed with which the carrier bar falls may be regulated within practical limits.

Means is also provided for separating and conveying the nuts individually to the crushing mechanism. A sorting table 70 is secured at an inclined angle to the side frames 1 and 2 by means of bolts 71. The sorting table comprises a box-like structure in which the bottom is formed of a series of inclined steps 72. The upper edge of each step is serrated to form a plurality of spaced notches or troughs 73, each aligning with one of the apertures formed in the cooperating pairs of crushing jaws. Apertures provided longitudinally through each trough communicate with the bottom sides of the sorting table. A plurality of fingers 74 mounted angularly upon a frame 75 extends through the apertures in said table. The terminal end of each finger is serrated to conform to the shape of each trough 73, as best shown in Fig. 9.

Figure 3:
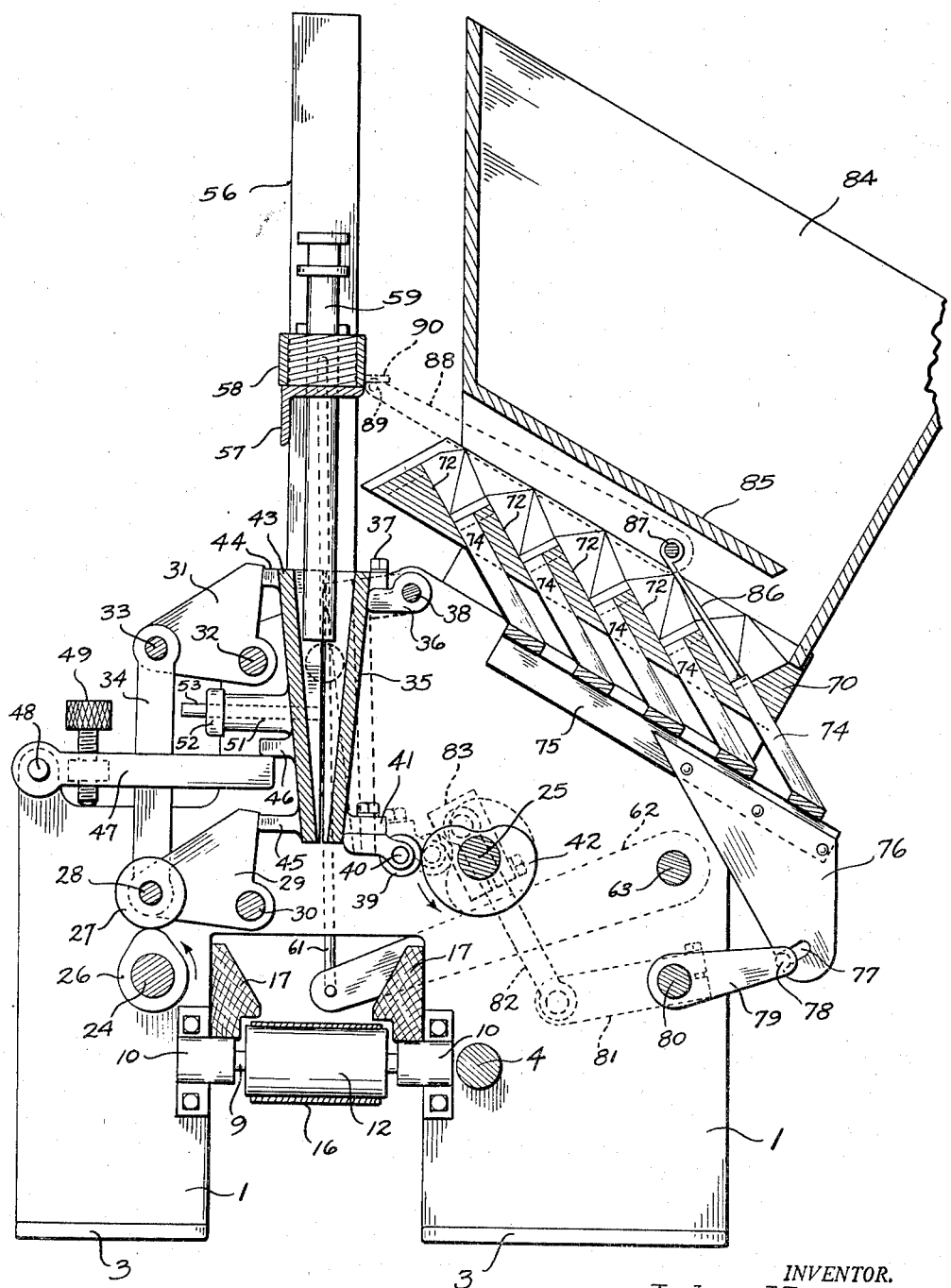
Fig. 3 is a sectional elevation taken along the line 3—3 in Fig. 1 showing in full lines the closed position of the crusher jaws and illustrating in dotted outline the arrangement of parts when the right jaw is in retracted or open position.

The frame 75 underlying the table 70 is secured to end brackets 76 which are mounted detachably, by means of slots 77, on a supporting rod 78. This supporting rod is secured at its ends to the free ends of lever arms 79 mounted securely for rotation with shaft 80. A second lever 81 is secured at one end to shaft 80 and is joined pivotally at its opposite ends through link 82 to an eccentric cam 83 which is secured to shaft 25. Thus, as shaft 25 and cam 83 rotate in a clockwise direction, as viewed in Fig. 6, the arms 79 and 81 oscillate about pivot shaft 80 and the fingers 74 move angularly through the apertures formed in the table 70. The distance through which the fingers move is arranged to equal the distance between adjacent steps 72, as shown in Figs. 3, 4 and 9.

A hopper 84 is mounted removably above the sorting table 70. This hopper is provided with an elevated partial bottom 85 which provides an elongated opening adjacent the lowermost step of the sorting table. The hopper may thus be filled with nuts to be cracked and the latter are discharged upon the sorting table in continuous fashion. In order to prevent wedging or "arching over" of nuts along the lowermost step of the sorting table, I provide a plurality of shaker bars 86 secured at spaced intervals along a shaft 87 which is mounted laterally across the hopper below the partial bottom 85. The shaker bars are arranged to lie on opposite sides of the fingers 74, as shown in Fig. 9. Secured to one end of the shaft 87 is an arm 88 which extends forwardly toward the carrier bar 58. A pin 89 projects laterally from the free end of said arm and is arranged to engage a lug 90 protruding from the carrier bar 58. Normally, the weight of the several shaker bars is sufficient to hold them down upon the table 70 with the arm 88 in raised position, as shown in Fig. 4. When the carrier bar 58 drops to its lowermost position, however, the lug 90 engages the pin 89 and pivots the arm in a counterclockwise direction, as viewed in Fig. 3, thus raising the shaker bars 86 and breaking up any wedged mass of nuts adjacent the first step of the sorting table.

The operation of the nut cracking machine described hereinbefore is as follows: The drive motor (not shown) is energized to rotate the drive shaft 4, which in turn drives the conveyor belt 16 through shaft 9. Drive gear 18, keyed to shaft 4, rotates transfer gear 19 in a clockwise direction, as viewed in Fig. 2, thus causing counterclockwise rotation of gears 22 and 23. As shaft 24 rotates with gear 22, the eccentric cams 26 cause vertical oscillation of links 34 whereby the triangular plates 29 and 31 are rocked about their respective axes 30 and 32. As said plates move in a clockwise direction, they urge the crusher jaw 43 to the right, as viewed in Fig. 3, and as the plates move in a counterclockwise direction, said jaws move to the left by virtue of the force exerted against the opposing jaw 35 by the spring-actuated push rod 53.

Simultaneously with the rotation of shaft 24, shaft 25 rotates in a counterclockwise direction. As the kidney-shaped eccentric cam 42 rotates with shaft 25, the crusher jaw 35 is oscillated about the pivot pin 38 between open and closed positions. It is to be noted that the design of cam 42 permits the jaw 35 to be in closed position throughout a major portion of each revolution of shaft 25, whereas the shape of cam 26 affords a very short closing period for jaw 43. This latter action effects a sudden crushing of the nut shell rather than a slow squeezing action which would result if a slowly increasing pressure were applied.

As gear 23 rotates with shaft 25, the rib 65 and roller 66 alternately raises and lowers the arm 62 which actuates the carrier bar 58. Thus, as the crusher jaws are opened to discharge previously crushed nut shells and to receive a new supply of uncracked nuts, the carrier bar is in raised position and the tappet rods 59 are elevated above the crusher jaws. After the tapered apertures between the opened jaws have each received a nut from the conveyor table, the rib 65 passes from under the flange 64 of the arm 62 and the carrier bar and tappet rods fall by gravity with a speed regulated by the adjustment of the air valve 69 in cylinder 68. The tappet rods press downwardly upon the nuts and hold the latter in positive contact with the crusher jaws until the latter have closed and the shells have been cracked.

The rotation of shaft 25 also causes reciprocal oscillation of lever arms 79 and 81 about the shaft 80 as previously described. With a supply of nuts in hopper 84 and the sorting table 70 and fingers 74 arranged in the position shown in Fig. 3 and in the left-hand portion of Fig. 9, the levers 79 and 81 are beginning to rotate in a counterclockwise direction. The fingers 74 thus begin to move upwardly toward the next higher step 72 carrying the nuts contained in the notched ends of the fingers upwardly therewith. As the fingers approach the next higher level, the nuts are deposited in the trough of the step reached, and then the levers 79 and 81 rotate in a clockwise direction to return the fingers to their lowermost position. As this oscillatory motion is repeated, the nuts are carried upwardly through successive steps until the topmost row is discharged into the plurality of registering apertures between the crusher jaws.

It is to be noted that when the carrier bar 58 falls to its lowermost position, the shaker bars 86 are raised from the surface of the sorting table 70. This upward movement of the shaker bars dislodges the mass of nuts overlying the lowermost step 72 and permits more ready separation by the fingers 74. Should two or more nuts be carried by the finger to the next level, subsequent movement by the succeeding fingers causes separation into individual units. Thus complete separation of the nuts is assured before they reach the uppermost level and are discharged into the open crusher jaws.

Referring now to Fig. 4 of the drawings, the fingers 74 are in extended position ready to discharge the uppermost row of nuts. The crusher jaws are open and the tappet rods are elevated. The nuts are thus deposited in the apertures between the opposing jaws, whereupon the carrier bar drops and the tappet rods push downwardly upon the nuts. After the jaws have closed and the shells have been cracked, as shown in Fig.

3, the jaws open once more and discharge the cracked nuts upon the moving conveyor belt 16 from which they are conveyed to sorting apparatus where the meats and shell fragments are separated.

I claim:

1. In a nut cracking machine having a pair of crusher jaws movable relative to one another and defining a plurality of crushing chambers, yieldingly supported tappet members depending retractably above said crusher jaws, said tappet members being arranged to enter the nut cracking chambers of said crusher jaws and hold the nuts in contact with the latter, and drive means interconnecting said tappet members and said jaws for sequentially moving the tappet members into the chambers and moving the jaws in a crushing motion.

2. In a nut cracking machine having a pair of tapered crusher jaws movable relative to one another and defining a plurality of crushing chambers for cracking nuts of diverse sizes, telescoping extensible yieldingly supported tappet members depending retractably above said crusher jaws, said tappet members being arranged to enter the nut cracking chambers of said crusher jaws and hold the nuts in contact with the latter, and drive means interconnecting said tappet members and said jaws for sequentially moving the tappet members into the chambers and moving the jaws in a crushing motion.

3. In a nut cracking machine having a pair of crusher jaws movable relative to one another and defining a plurality of crushing chambers, guide members extending vertically above said jaws, a carrier bar mounted slidably on said guide members for vertical movement above said jaws, and yieldingly supported tappet members depending slidably through said carrier bar, said tappet members being arranged to enter the nut cracking chambers of said crusher jaws and hold the nuts in contact with the latter while said jaws move relative to one another.

4. A nut cracking machine, comprising a frame, a pair of tapered crusher jaws defining a plurality of crushing chambers, one of said jaws being mounted pivotally on said frame, the other of said jaws resting freely upon arms mounted pivotally on said frame, pressure means operatively interconnecting said jaws for separating the latter, cam means operatively engaging said jaws, drive means interconnecting said cam means for establishing sequential operation, yieldingly supported tappet members depending retractably above said crusher jaws, said tappet members being arranged to enter the nut cracking chambers of said crusher jaws and hold the nuts in contact with the latter, and drive means interconnecting said tappet members and said jaws.

5. A nut cracking machine, comprising a frame, a pair of tapered crusher jaws defining a plurality of crushing chambers, one of said jaws being mounted pivotally on said frame, the other of said jaws resting freely upon arms mounted pivotally on said frame, pressure means operatively interconnecting said jaws for separating the latter, cam means operatively engaging said jaws, drive means interconnecting said cam means for establishing sequential operation, guide members extending vertically above said jaws, a carrier bar mounted slidably on said guide members for vertical movement above said jaws, yieldingly supported tappet members depending slidably through said carrier bar, said tappet members being arranged to enter the nut cracking chambers of said crusher jaws and hold the nuts in contact with the latter, damping means operatively connecting said carrier bar and said guide members for regulating the force with which said tappet members strike said nuts, and drive means interconnecting said carrier bar and said jaws.

JOHN HERMENS.

REFERENCES CITED

The following references are of record in the file of this patent:

UNITED STATES PATENTS

| Number | Name | Date |
|---|---|---|
| 1,038,229 | Suzzi | Sept. 10, 1912 |
| 1,272,803 | Hayes et al. | July 16, 1918 |
| 1,849,680 | McKee | Mar. 15, 1932 |
| 1,865,086 | Cutler | June 28, 1932 |
| 2,175,425 | Berneike | Oct. 10, 1939 |
| 2,212,213 | Rothenberger et al. | Aug. 20, 1940 |
| 2,288,191 | Hayes | June 30, 1942 |
| 2,296,088 | Carter | Sept. 15, 1942 |
| 2,307,656 | Abbott | Jan. 5, 1943 |

FOREIGN PATENTS

| Number | Country | Date |
|---|---|---|
| 20,018 | Denmark | May 7, 1914 |